United States Patent [19]

Oliver

[11] 4,443,920

[45] Apr. 24, 1984

[54] METHOD OF MANUFACTURING A GATE VALVE BODY

[76] Inventor: John P. Oliver, 37 Stillforest, Houston, Tex. 77024

[21] Appl. No.: 300,216

[22] Filed: Sep. 8, 1981

[51] Int. Cl.³ .................... B21D 53/00; B21K 29/00; B23P 15/02; B23P 15/04
[52] U.S. Cl. ................. 29/157.1 R; 29/423; 29/557; 29/558; 251/329; 408/1 R
[58] Field of Search ................. 29/157.1 R, 423, 557, 29/558, 402.11, 402.06; 408/1 R; 251/329, 326

[56] References Cited

U.S. PATENT DOCUMENTS

| | | | |
|---|---|---|---|
| 1,858,927 | 5/1932 | Gray et al. | 29/157.1 R |
| 2,011,484 | 8/1935 | Harman | 29/402.11 |
| 2,156,692 | 5/1939 | Hixon | 408/1 R X |
| 2,334,855 | 11/1943 | Zinkil | 408/1 R |
| 2,807,875 | 10/1957 | Snyder | 29/423 |
| 3,197,175 | 7/1965 | Siepmann | 251/329 X |
| 4,319,736 | 3/1982 | Muller et al. | 251/329 |

FOREIGN PATENT DOCUMENTS 54-157390 12/1979 Japan ................. 408/1 R

Primary Examiner—Charlie T. Moon
Attorney, Agent, or Firm—Vaden, Eickenroht, Thompson, Bednar & Jamison

[57] ABSTRACT

There are disclosed two embodiments of a gate valve having a forged body in which a generally rectangular cavity to receive the gate for opening and closing each flowway through the body is formed by drilling a first hole within the forging from which the body is to be made, and then drilling at least one other hole within the forging which is parallel to and overlaps a prior drilled hole therein.

8 Claims, 10 Drawing Figures

METHOD OF MANUFACTURING A GATE VALVE BODY

This invention relates to an improved method of manufacturing the body of a gate valve, and to a gate valve having a body manufactured in accordance with such a method.

Gate valve bodies are often cast since this permits the cavity in which the gate is to be received to conform as closely as possible in size and shape to the gate, thereby minimizing metal removal as well as the distance which must be spanned by seats for sealing between the body and opposite sides of the gate. Thus, although wrought or forged bodies normally have less defects, and thus require a minimum of testing, considerable time and expense in removing excess metal would be involved in forming a generally rectangular cavity therein to receive a gate, whether by milling, shaping, or other metal working process. Alternatively, if an effort were made to simplify machining by forming a cylindrical cavity in the forging, it would be necessary to provide supports for the length of the seats required to span the space between the cavity and the opposite sides of the generally rectangular gate. Whether formed in a cast or forged body, the cavity provides a pressure chamber in which the gate is guidably movable between valve opening and closing positions; and, as mentioned, seats for sealably engaging opposite faces of the gate are ordinarily received within recesses formed in the flowway through the valve body at its intersection with opposite sides of the cavity.

The object of this invention is to provide a method of manufacturing a valve body for a gate valve which obviates the aforementioned and other problems encountered in the prior art; and, more particularly, to provide such a method which enables a substantially rectangular cavity to be formed in a forged gate valve body with less complex metal removal than is required in accordance with existing procedures.

This and other objects are accomplished, in accordance with the illustrated embodiment of the invention, by drilling a first hole within a forging from which the gate valve body is to be made, and then drilling at least one other hole within the forging parallel to and overlapping a prior drilled hole so as to form the body cavity. In accordance with a further step of the invention, flowway openings are then formed in the forged body to connect opposite sides of the cavity with the exterior of the body. More particularly, in the preferred and illustrated embodiment of the invention, the inner ends of the flowway openings are formed with enlarged diameters to receive seats for engagement with opposite faces of the gate.

Preferably, a plug is disposed within the first hole so as to provide support for a rotary bit throughout its circumference as another hole is drilled adjacent to and in overlapping relation with the first hole. As illustrated, the cavity consists of at least two such other holes on opposite sides of the first hole, and, while disposed in the first hole, the plug supports the full circumference of the bit for drilling each of said other holes. The plug is temporary in the sense that it is removed from the first hole following its use to support a bit in drilling one or more additional holes, although the invention contemplates that the plug may be disposed within another hole for reuse in supporting a bit in drilling a hole adjacent thereto.

As also illustrated, the lower ends of the drilled holes are conical due to the shape of the lower end of the bit, and tools having flat bottomed cutting surfaces may be used to drill into the conical lower ends of at least a pair of such holes to remove the upper portions thereof and thereby form substantially coplanar landing surfaces for the end of the gate in one of its alternate positions.

In one embodiment of the invention, the gate valve body cavity is formed by three adjacent, overlapping holes of approximately equal diameter and having their axes arranged within a common plane. In another embodiment of the invention, wherein there is limited center line to center line spacing between flowways to be controlled by one or more of the gate valves, or wherein the forging is of limited dimension widthwise of the gate, at least one end of the cavity is formed by a pair of adjacent, overlapping holes which are in turn adjacent to and overlap with a central hole which is of larger diameter than that of each hole of the pair of side holes.

In the drawings, wherein like reference characters are used throughout to designate like parts:

FIG. 1 is a perspective view of a gate valve having a cavity formed in the body thereof in accordance with one embodiment of the present invention;

FIGS. 2, 3 and 4 are perspective views of a portion of the body of the valve of FIG. 1 and illustrating the sequential steps of forming the cavity therein by first drilling a central hole in the forging, as shown in FIG. 2, then disposing a plug within the first hole and drilling another hole in the forging adjacent to and in overlapping relation to one side of the first hole, as shown in FIG. 3, and finally drilling a third hole in the forging adjacent to and in overlapping relation to the opposite side of the first hole, following which the plug is removed from the first hole to open the cavity, as shown in FIG. 4;

Figure 1:
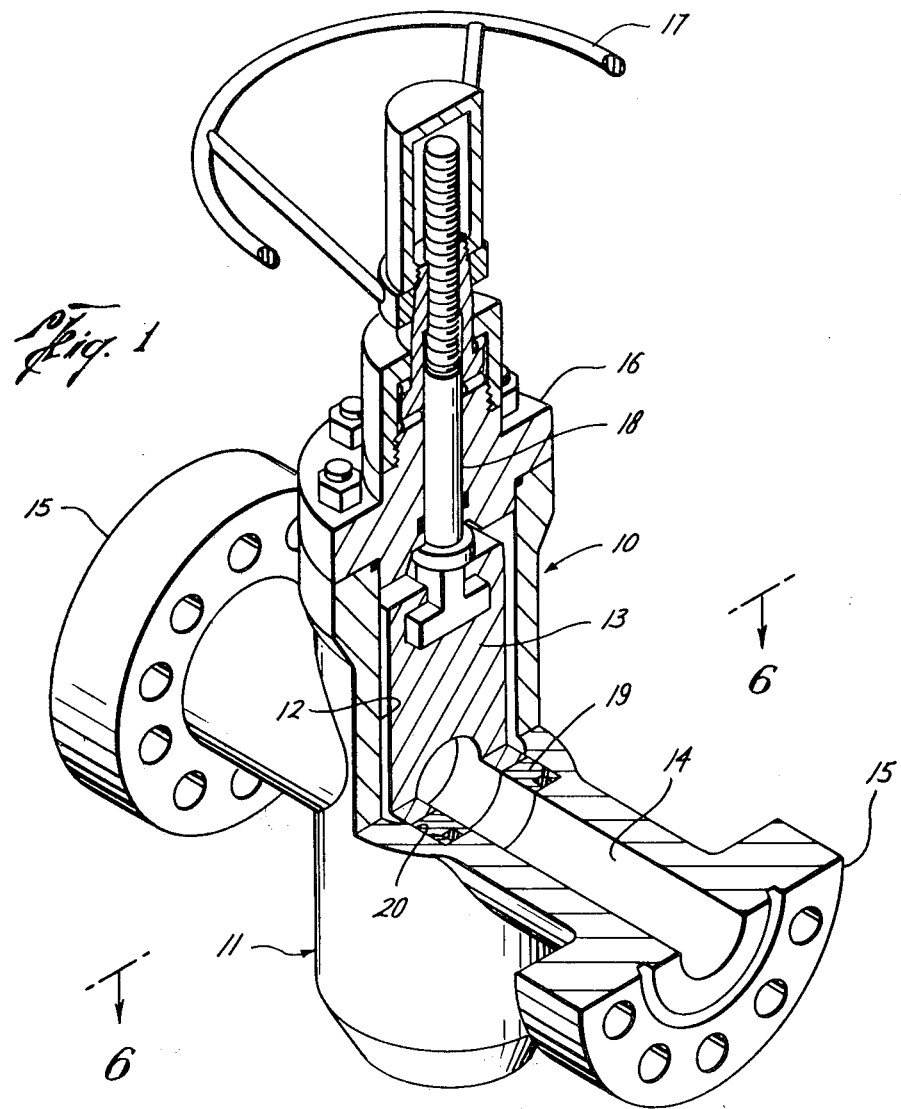

The gate valve 10 shown in FIG. 1 includes a body 11 in which a cavity 12 is formed to receive a gate 13 for moving between positions opening and closing the flowway 14 through the body which connects with opposite sides of the cavity. The body has end connections such as the flanged hubs 15 through which the outer ends of the flowway extend. In accordance with this invention, the body may be forged as one piece, including the end connections.

Figure 7:
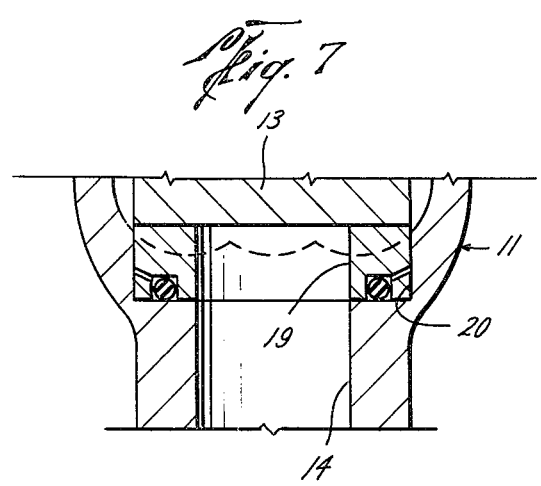
FIG. 7 is another cross-sectional view, similar to FIG. 6, of one half of the valve body, but with the gate in place, and a seat installed on one side thereof in the flowway recess.

A bonnet 16 is mounted on the upper end of the valve body to enclose the open, upper end of the gate cavity and to support a handwheel 17 or other operator connected to the gate by a stem 18. The gate has a port therein which is adapted to be moved into and out of a position aligned with the flowway by manipulation of the handwheel 17 to raise or lower the stem. As shown in FIGS. 1 and 7, seats 19 are carried within recesses 20 in the inner ends of the flowway intersections with the cavity for engaging opposite the faces of the gate 13.

In fabricating valve body 11 from the one piece forging, a first hole $H_1$ is drilled into one end or face of the forging to which the bonnet is connected along a vertical axis generally intermediate the opposite sides of the forging. As shown, the lower end of the hole $H_1$, which approaches the opposite end or face of the forging, is conically shaped due to the shape of the bit on the lower end of the rotary drill.

A second hole $H_2$ is then drilled into the upper end of the forging parallel to and in overlapping relation to one side of the first hole $H_1$. More particularly, and as will be discussed in more detail to follow, the hole $H_2$ is drilled to a depth approximating but somewhat less than the depth of hole $H_1$. Prior to the drilling of the hole $H_2$, a cylindrical plug 21 of steel, or other metal or material having the same machining characteristics similar to the forging F, is fitted closely into the hole $H_1$, so that, as previously mentioned, the rotary drill bit will be supported about its entire circumference as the hole $H_2$ is formed. Another advantage to the plug is that, in closing what would otherwise be an open space within the second hole, it would prevent the loss of lubricant pressure and thus insure that chips are washed out of the cutting area.

Figure 2:
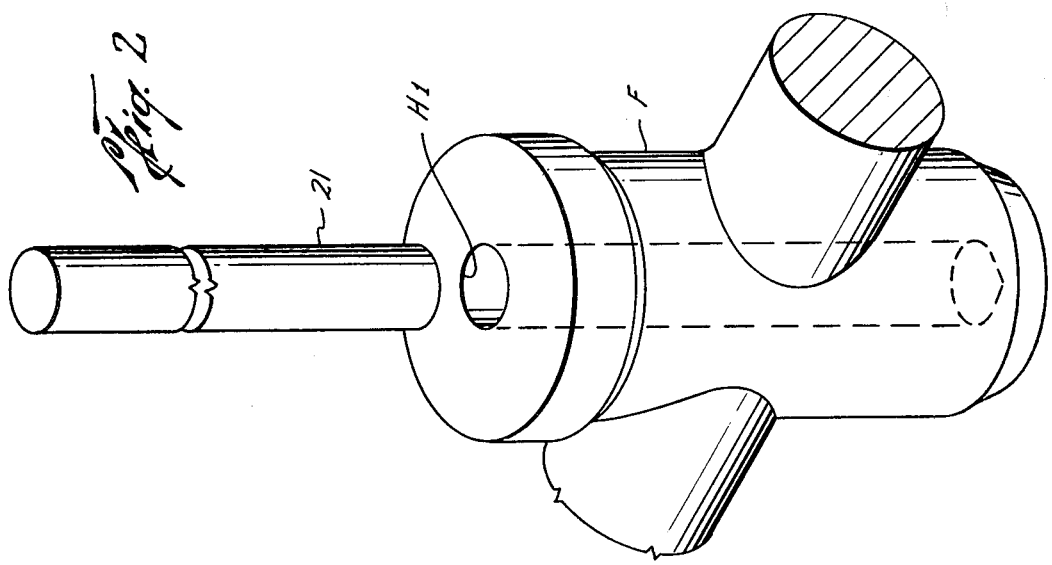

Following drilling of hole $H_2$, and with plug 21 still within hole $H_1$, as shown in FIG. 2, a third hole $H_3$ is drilled into the upper end of the forging parallel to and in overlapping relation to the opposite side of the hole $H_1$. As indicated by the interrupted lines in FIG. 4, hole $H_3$ is drilled to a depth approximately equal to that of hole $H_2$, and thus somewhat less than that of hole $H_1$, following which plug 22 is removed from the hole $H_2$ to open the cavity. Since the plug is cylindrical, as shown, the bit will remove elongate strips from its side faces 22. Alternatively, the plug may have elongate grooves preformed in the sides to provide surfaces forming continuations of the cirumference of the second hole to be drilled. Also, after use in the manner described, and removal from the first hole, it may, upon indexing, be disposed in other holes for the same purpose.

Figure 4:
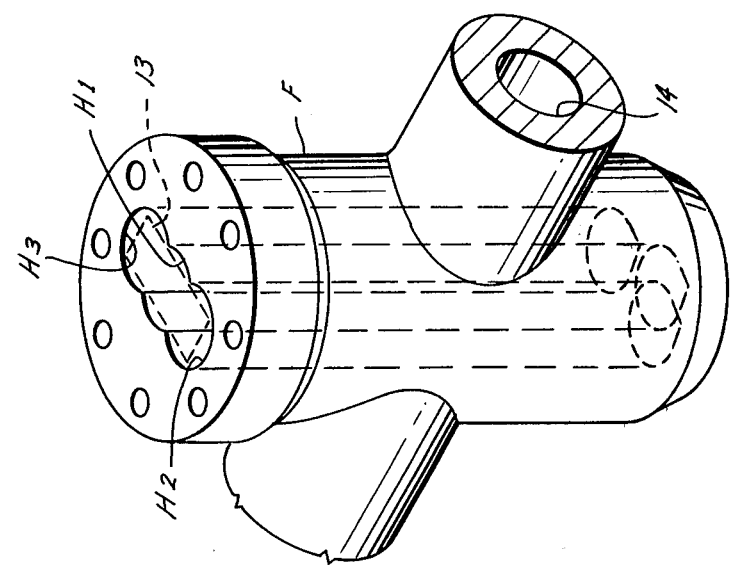
Figure 3:
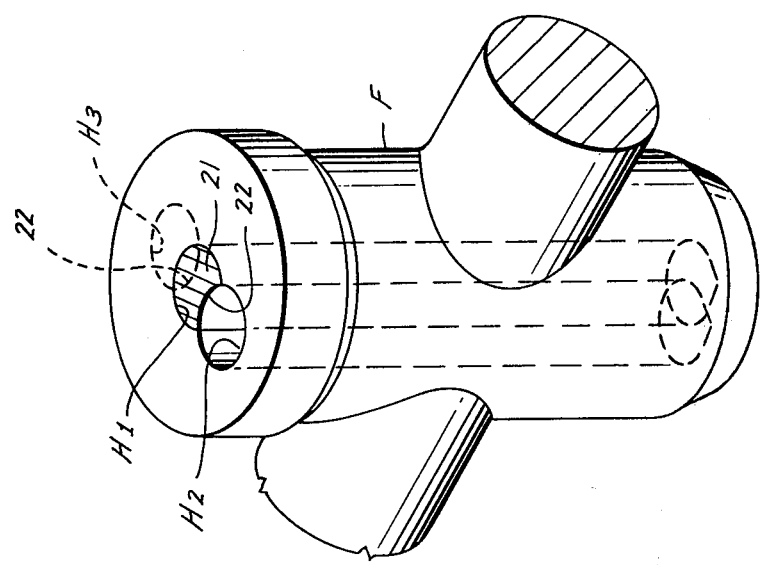

As shown in FIG. 4, each of the holes is of the same diameter, enabling each to be drilled with the same bit. More particularly, the axes of all three holes lie in a common plane and each hole overlaps with an adjacent hole to the same extent as the other so that their lines of intersection lie within common planes on opposite sides of and parallel to the plane common to their axes to form a cavity which is of generally rectangular cross section. These common planes are close to but not in interference with opposite sides of the gate 13 whereby the distance to be spanned by the seats, and thus the length of the seats themselves, is minimized. The corners of the gate, on the other hand, may actually engage outer sides of the end holes so as to be guided thereby in reciprocating between opened and closed positions.

As shown in FIG. 4, holes are drilled coaxially through the hubs on each side of the forging and into the cavity so as to form the flowway openings connecting with each side of the cavity. Although the hubs provide a convenient means for connecting the valve in a pipeline, it will be understood that, in the manufacture of a valve in accordance with the present invention, the valve body may instead by made from a forging having cylindrical or non-flanged hubs, or, for that matter, a forging without hubs, in which case end connections may be added to the valve body by welding or the like.

Figure 5:
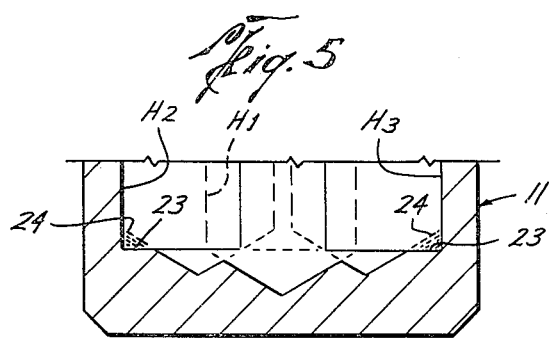
FIG. 5 is a vertical sectional view of the lower end of the cavity of the valve body of FIGS. 1 to 4, with portions of the conical lower ends of the outermost holes of the cavity removed, as shown by shaded areas, to form coplanar surfaces to engage the end of the gate.

The shaded portions 24 of the conical lower ends of the outer holes $H_2$ and $H_3$ (see FIG. 5) are removed by suitable tools to form coplanar landing surfaces 23 for the lower end of the gate. More particularly, these surfaces 23 are formed on a level no deeper than the intersection of the lower conical end of the deepest central hole $H_1$ with its cylindrical portion, so that the landing surfaces will be contacted by the gate before contact with any other portions of the lower ends of the cavity. This, of course, is merely a preferred embodiment of the invention, and edge surfaces of the lower end of the gate may instead land upon conical surfaces on the lower end of the cavity.

Figure 6:
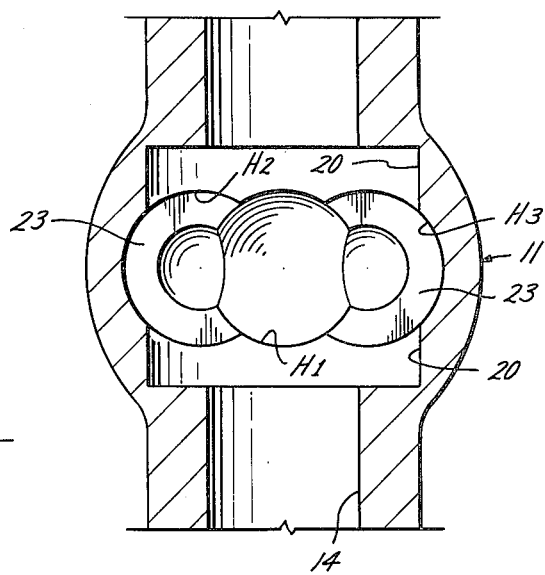
FIG. 6 is a cross-sectional view of the valve body, as seen along broken lines 6—6 of FIG. 1.

As shown in FIGS. 6 and 7, the inner ends of the flowway openings are enlarged at their intersection with the cavity 13 to form the recesses 20 in which annular seats 19 are received (see FIG. 7) for engaging opposite faces of the gate 14. These seats are of course assembled in the recesses through the cavity prior to installation of the gate within the cavity. The seats normally carry one or more sealing members for sealing between them and the valve body recess.

Figure 8:
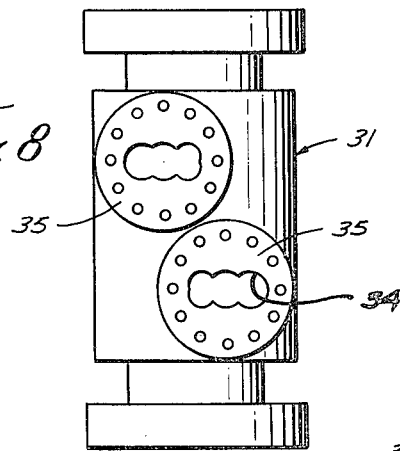
FIG. 8 is a perspective view of the side of a valve having dual flowways each controlled by a gate received within a cavity formed in the valve body in accordance with another embodiment of the invention.
Figure 9:
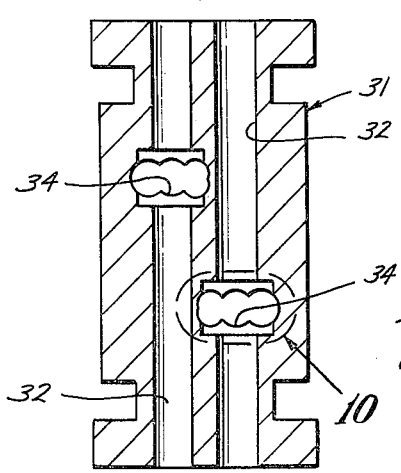
FIG. 9 is a vertical sectional view of the valve of FIG. 8.
Figure 10:
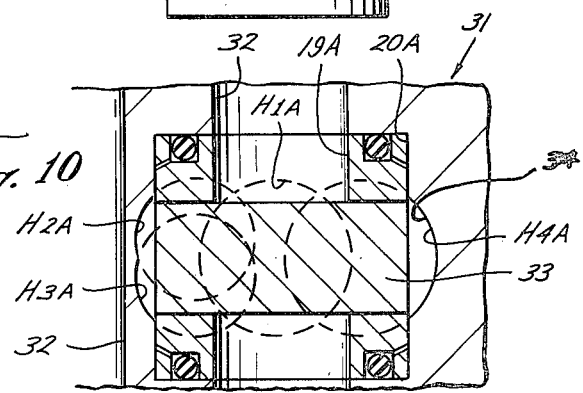
FIG. 10 is an enlarged detailed view of a portion of the valve of FIGS. 8 and 9 to illustrate the manner in which a cavity is formed to enable the flowway centerlines to be close together.

The valve 31 shown in FIGS. 8 to 10 includes a forged body of generally cylindrical shape having flanged ends and a pair of parallel flowways 32 extending therethrough from one end to the other. Each flowway is controlled by a gate 33 received within a cavity 34 formed in accordance with another embodiment of this invention. Flat faces 35 are formed on a side of the forged body at the intersections of the open end of each cavity therewith, and bonnets (not shown) carrying operators for the gates are adapted to be mounted on these flat faces.

As shown in FIG. 9, due to the close spacing of the flowways 32, the gates 33 and thus the cavities in which they move to open and close the flowways are staggered lengthwise of the flowways. As previously described, each cavity 34 is so formed as to minimize the lateral distance between its inner end and the centerline of the flowway with which it connects.

In the forming of each cavity 35, a first hole $H_{1A}$ is drilled into one of the flat faces on the side of the forging from which the valve body is to be made to intersect the centerine of the flowway to be formed and in a direction perpendicular thereto. Additional holes $H_{2A}$ and $H_{3A}$ are then drilled into the forging on the inner side and parallel to and in overlapping relation to one another as well as to the first drilled hole $H_{1A}$. More particularly, the holes $H_{2A}$ and $H_{3A}$ are of equal diameter but smaller than that of $H_{1A}$ and overlap in such a manner that their outer edges are spaced laterally apart a distance substantially equal to the diameter of hole $H_{1A}$.

Although the other end of each cavity may be formed in a similar manner, particularly if there are similar space limitations at such other end, whether because of another parallel flowway, or an outer surface of the forging, such other end is instead formed by the drilling of another single hole $H_{4A}$ parallel to and in overlapping relation to the other side of the first drilled hole $H_{1A}$.

More particularly, this latter hole is of the same size as the central hole $H_{1A}$ and overlaps therewith in such a manner that its lines of intersection with the central hole lie within planes common to the lines of intersection of the central hole with side holes $H_{2A}$ and $H_{3A}$ and parallel to a plane common to the axes of holes $H_{1A}$ and $H_{4A}$.

To complete the valve, flowways may be drilled through the body thereof, as shown, and recesses formed in the flowways at their intersections with opposite sides of the cavities. Upon assembly of seats within the recesses, the gate may be installed within the cavity and between the seats.

Obviously, this invention has application to other shapes and types of gate valves, including blow-out preventers which are used to control pressure within an oil or gas well as it is being drilled, and in which there are a pair of gates or rams each reciprocable within an individual cavity.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a method of manufacturing a gate valve, the steps of drilling a first hole having a closed end within a forging from which the body of the valve is to be made, drilling at least one other hole having a closed end within the forging which is parallel to and overlaps a prior drilled hole therein so as to form a generally rectangular cavity closed end in the body in which a gate may be received for movement between positions opening and closing a flowway through the body which intersects the cavity and inserting a gate into said generally rectangular cavity.

2. In a method of manufacturing a gate value body, the steps of drilling a first hole having a conical closed end within a forging from which the body of the value is to be made, drilling at least one other hole having a conical closed end within the forging which is parallel to and overlaps a prior drilled hole therein so as to form a generally rectangular closed end cavity in the body in which a gate may be received for movement between positions opening and closing a flowway through the body which intersects the cavity, and removing the outer portions of the conical ends to form substantially coplanar landing surfaces for an end of the gate by using a rotating tool having a flat bottom cutting surface.

3. In the method of claim 1 or 2, the further step of drilling openings in the forging which connect opposite sides of the cavity with the exterior of the body so as to form the flowway therethrough.

4. In the method of claim 3, the further steps of forming enlarged diameters on the inner ends of the flowway openings to receive seats for engagement with opposite faces of the gate.

5. In the method of claim 1 or 2, the further step of disposing a plug within the first hole, while another hole is drilled adjacent to and in overlapping relation with the first hole, so that a rotary bit for drilling the other hole is supported throughout its circumference, and then removing said plug from the first hole to open the cavity.

6. In the method of claim 5, the further step of drilling at least two such other holes adjacent to and in overlapping relation to the first hole, while said plug is disposed within said first hole, so that the rotary bit for drilling each of said other holes is supported throughout its circumference, and removing said plug from the first hole following drilling of said other holes.

7. In the method of claim 1 or 2, wherein the cavity is formed of at least three adjacent holes of approximately equal dameter and having their axes arranged in coplanar relation.

8. In the method of claim 1 or 2, wherein the cavity is formed of a pair of holes at one end, each hole of the pair of end holes overlapping with one another and an intermediate hole and having a diameter less than that of the intermediate hole.

* * * * *